(No Model.)
W. C. CRANMER & S. W. ARNOLD.
METHOD OF CONSTRUCTING UNDERGROUND CONDUITS.
No. 400,308. Patented Mar. 26, 1889.
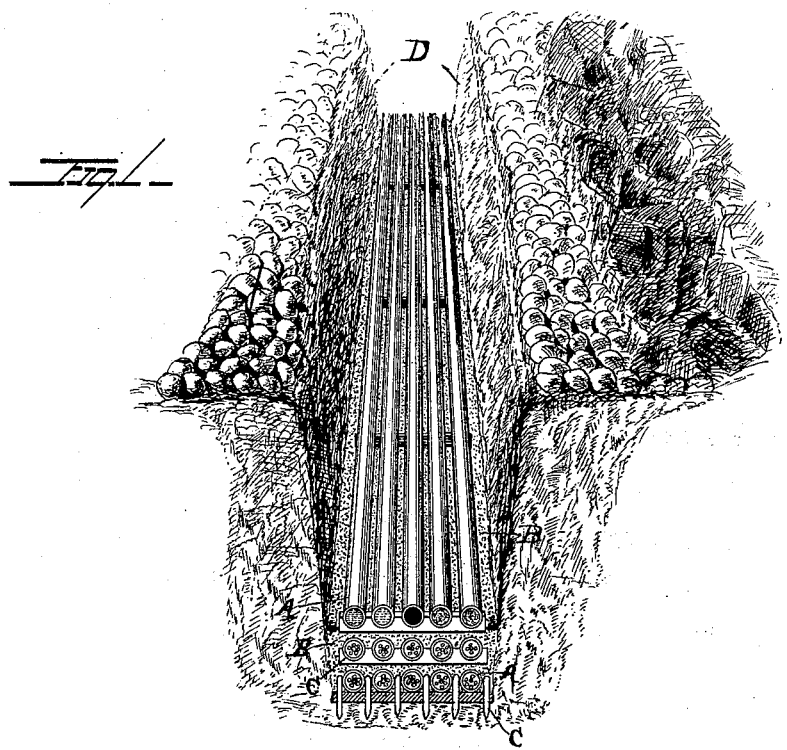
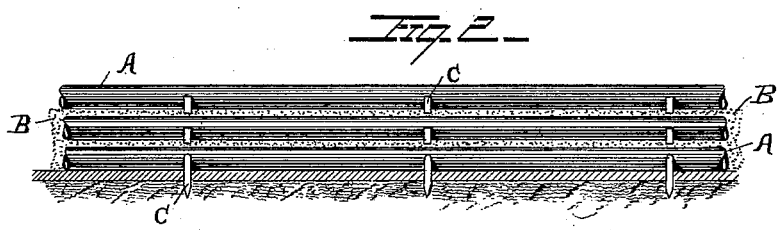
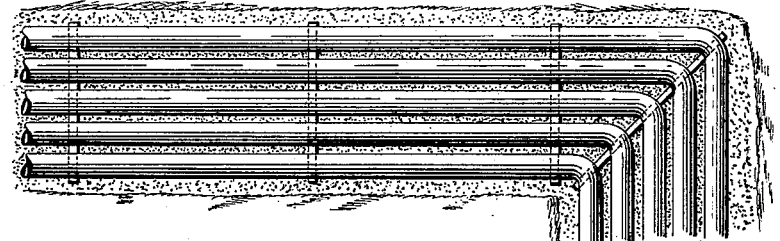
WITNESSES:
John D Harris
Frank Schofield
INVENTORS,
W. Clarence Cranmer,
Sydney W. Arnold.
By John Alley Jr
Their ATTORNEY.

UNITED STATES PATENT OFFICE.

WILLIAM CLARENCE CRANMER AND SYDNEY WILLIAM ARNOLD, OF PHILADELPHIA, PENNSYLVANIA.

METHOD OF CONSTRUCTING UNDERGROUND CONDUITS.

SPECIFICATION forming part of Letters Patent No. 400,308, dated March 26, 1889.

Application filed October 19, 1888. Serial No. 288,601. (No model.)

*To all whom it may concern:*

Be it known that we, WILLIAM CLARENCE CRANMER, a citizen of the United States, and SYDNEY WILLIAM ARNOLD, a subject of the Queen of Great Britain, both residing in the city and county of Philadelphia, in the State of Pennsylvania, have jointly invented certain new and useful Improvements in the Method of Constructing Underground Conduits for Electric and other Wires, of which the following is a full, clear, and exact description, reference being had to the accompanying drawings, forming part of this specification, and in which—

Figure 1 is a perspective view in end section, showing the flexible tubes forming the passage-ways or ducts embedded in the trench and the pins and framing for holding the tubes in line. Fig. 2 is a side view of the same; and Fig. 3 is a top plan view of the tubes, represented as rounding a corner.

Heretofore conduits for electric and other wires have been constructed in comparatively short sections, of iron, wood, or other rigid tubing, or of clay or other material coupled or fused together at great expense and loss of time.

Our invention consists in the employment of flexible tubing of a desired diameter and length arranged singly in layers, groups, or in any desired manner, and embedded in concrete, cement, pitch, or other homogeneous material; also, to provide a conduit in which the passage-ways or ducts for the wires are lined with a non-conducting material; also, by reason of the flexibility of the tubing providing a ready means of making turns—as, for instance, in rounding a street-corner or for making connection with a building; and, finally, in the formation of the conduit in the ditch or trench direct, to the end that a conduit having passage-ways or ducts of non-conducting material may be constructed to any desired length in the ditch or trench direct without the aid of intermediate couplings, and that electric and other wires may be laid underground easily and quickly and the coupling of numerous short sections of pipes or conduit avoided, thereby causing a great saving in expense and lost time.

Referring to the drawings, A are the flexible tubes, passage-ways, or ducts for the wires, composed of any suitable flexible non-conducting material, such as rubber hose or canvas tubing coated with rubber, pitch, or any suitable material that will admit of the tubing retaining sufficient flexibility to make an arc of a circle.

B is the homogeneous material—such as concrete, cement, pitch, or the like—in which the tubes are embedded.

C are the pins, framing, or other device for retaining the tubes in line.

D is the trench or ditch in which the conduit is constructed.

In carrying out our invention the flexible tubes for the wires, composed of non-conducting material—such as rubber hose or canvas tubing coated with rubber, pitch, or the like—and of a desired diameter and length, are first hermetically closed at one end by means of suitable clamps or in any convenient manner, and after being charged with water, air, sand, sawdust, or the like are closed at their opposite end in a similar manner.

The tubes so charged are laid within the ditch or trench, and preferably held in place by means of wooden pins, suitable framing, or in any convenient manner, and a layer of concrete, cement, pitch, or other homogeneous material applied, completely embedding the tubes, except at their respective ends. After the homogeneous material employed has set or solidified, the tubes are opened at their respective ends and the temporary filling freed or removed, to the end that a conduit of any desired length and curvature is formed provided with passage-ways or ducts of any desired diameter, lined with a non-conducting material.

It will be readily understood that any desired number of these tubes may be arranged in layers or groups after the manner hereinbefore described, the use of pins, framing, or other device for retaining the tubes in place not being essential to the complete carrying out of our invention.

It will also be obvious that a conduit may be constructed in the manner hereinbefore described to any desired length in the trench or ditch proper without the employment of intermediate coupling devices, and that, if desired, the tubes themselves may be withdrawn, leaving the conduit composed entirely of the cement or other homogeneous material employed.

Having thus described our invention, we claim—

1. The method herein described of forming continuous underground conduits of plastic material for electric and other wires in a ditch or trench direct, which consists in providing a flexible casing composed of non-conducting material having a core of water, air, sand, sawdust, or the like and temporarily hermetically closed at both ends, in building the conduit material around said casing, and subsequently freeing the core therefrom, substantially as described.

2. The method herein described of forming continuous underground conduits of plastic material for electric and other wires in a ditch or trench direct, which consists in providing a flexible casing having a core of water, air, sand, sawdust, or the like and temporarily hermetically closed at both ends, in building the conduit material around said casing and subsequently freeing the core therefrom, and finally withdrawing the casing, substantially as described.

3. The method herein described of forming continuous underground conduits of plastic material for electric and other wires in a ditch or trench direct, which consists in providing a flexible casing composed of non-conducting material having a core of water, air, sand, sawdust, or the like and temporarily hermetically closed at both ends, in further providing suitable means for retaining the casing in position, and finally in building the conduit material around said casing and subsequently freeing the core therefrom, substantially as shown and described.

4. The method herein described of forming continuous underground conduits of plastic material for electric and other wires in a ditch or trench direct, which consists in providing a flexible casing having a core of water, air, sand, sawdust, or the like and temporarily hermetically closed at both ends, in further providing suitable means for retaining the casing in position, in further building the conduit material around said casing and subsequently freeing the core therefrom, and finally withdrawing the casing, substantially as shown and described.

In testimony whereof we have hereunto signed our names this 16th day of October, A. D. 1888.

WILLIAM CLARENCE CRANMER.
SYDNEY WILLIAM ARNOLD.

In presence of—
JOHN JOLLEY, Jr.,
JOHN D. HARRIS.